US012591467B2

(12) United States Patent
Bidari et al.

(10) Patent No.: US 12,591,467 B2
(45) Date of Patent: Mar. 31, 2026

(54) SYSTEM AND METHOD FOR HALTING PROCESSING CORES IN A MULTICORE SYSTEM

(71) Applicant: SAMSUNG ELECTRONICS CO., LTD., Suwon-si (KR)

(72) Inventors: Mallikarjun Shivappa Bidari, Bengaluru (KR); Divakar Kulkarni, Bengaluru (IN); Raju Siddappa Udava, Bengaluru (IN); Shashank Vimal, Bengaluru (IN); Tushar Vrind, Bengaluru (IN); Venkata Raju Indukuri, Bengaluru (IN); Harish Kumar Veerappanchatram Sundaramurthy, Bengaluru (IN); Rajiv Hasija, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 708 days.

(21) Appl. No.: 17/876,144

(22) Filed: Jul. 28, 2022

(65) Prior Publication Data

US 2023/0058920 A1      Feb. 23, 2023

(30) Foreign Application Priority Data

Aug. 18, 2021      (IN) .............................. 202141037464

(51) Int. Cl.
| | |
|---|---|
| *G06F 9/52* | (2006.01) |
| *G06F 9/38* | (2018.01) |
| *G06F 9/48* | (2006.01) |

(52) U.S. Cl.
CPC .............. *G06F 9/52* (2013.01); *G06F 9/3889* (2013.01); *G06F 9/4881* (2013.01)

(58) Field of Classification Search
None
See application file for complete search history.

(56)                References Cited

U.S. PATENT DOCUMENTS

| | | | | |
|---|---|---|---|---|
| 7,451,333 B2 * | 11/2008 | Naveh | ................... | G06F 1/3203 |
| | | | | 713/323 |
| 7,769,958 B2 * | 8/2010 | Kinter | ................. | G06F 12/0833 |
| | | | | 711/147 |
| 8,195,896 B2 * | 6/2012 | Barsness | ................. | G06F 9/528 |
| | | | | 718/102 |
| 8,458,412 B2 | 6/2013 | Kottapalli et al. | | |
| 8,713,262 B2 * | 4/2014 | Overby | ................. | G06F 1/3206 |
| | | | | 711/144 |

(Continued)

FOREIGN PATENT DOCUMENTS

| | | |
|---|---|---|
| WO | 2017/105638 A1 | 6/2017 |

OTHER PUBLICATIONS

Communication dated Feb. 12, 2025 issued by the Intellectual Property India in Indian Patent Application No. 202141037464.

*Primary Examiner* — Van H Nguyen
(74) *Attorney, Agent, or Firm* — Sughrue Mion, PLLC

(57)                ABSTRACT

A multicore computing device includes a memory and a processor coupled to the memory. The processor includes plural cores and a multiple input multiple output (MIMO) block coupled to the cores. The MIMO block receives a halt request from a first core of the cores, transmits a core-halt request to one or more other cores other than the first core, to halt execution of the one or more other cores, and permits the first core to lock with a shared resource.

16 Claims, 12 Drawing Sheets

RECEIVE HALT REQUEST FROM CORE-0      ——S300

TRANSMIT CORE-HALT REQUEST TO CORES OTHER THAN CORE-0      ——S302

PERMIT CORE-0 TO LOCK SHARED RESOURCE      ——S304

(56)              References Cited

U.S. PATENT DOCUMENTS

| | | | |
|---|---|---|---|
| 8,782,451 B2 * | 7/2014 | Henry | G06F 1/3296 |
| | | | 713/323 |
| 8,839,253 B2 | 9/2014 | Gellerich et al. | |
| 8,862,917 B2 | 10/2014 | Ulmer et al. | |
| 8,966,491 B2 | 2/2015 | Calciu et al. | |
| 9,075,764 B2 * | 7/2015 | Saar | G06F 15/167 |
| 9,152,468 B2 | 10/2015 | Waddington et al. | |
| 9,465,432 B2 * | 10/2016 | Henry | G06F 12/0891 |
| 9,513,687 B2 * | 12/2016 | Henry | G06F 9/30087 |
| 9,736,670 B2 | 8/2017 | Mehta et al. | |
| 9,952,654 B2 | 4/2018 | Henry et al. | |
| 11,494,228 B2 * | 11/2022 | Suh | G06F 9/4881 |
| 11,586,443 B2 * | 2/2023 | Baronne | G06F 11/3632 |
| 2009/0307466 A1 * | 12/2009 | Barsness | G06F 9/528 |
| | | | 712/E9.016 |
| 2011/0185154 A1 | 7/2011 | Stellwag | |
| 2012/0151264 A1 | 6/2012 | Balkan et al. | |
| 2013/0061005 A1 * | 3/2013 | Overby | G06F 1/3225 |
| | | | 711/E12.001 |
| 2013/0346800 A1 * | 12/2013 | Gulati | G06F 11/27 |
| | | | 714/E11.17 |
| 2014/0007097 A1 | 1/2014 | Chin et al. | |
| 2015/0046680 A1 | 2/2015 | Henry et al. | |
| 2018/0032376 A1 * | 2/2018 | Udava | G06F 9/4881 |

* cited by examiner

FIG. 2
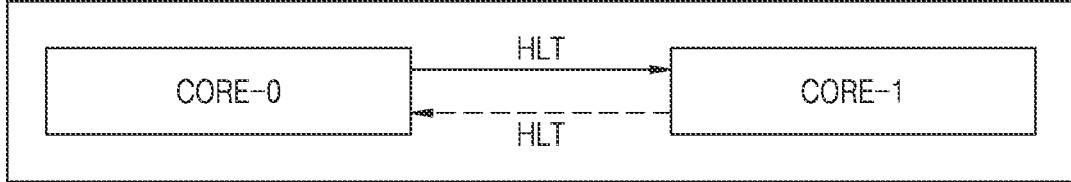
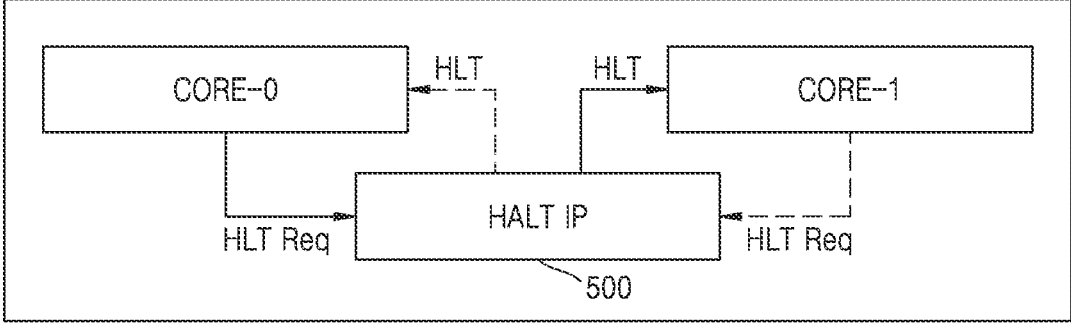

FIG. 9

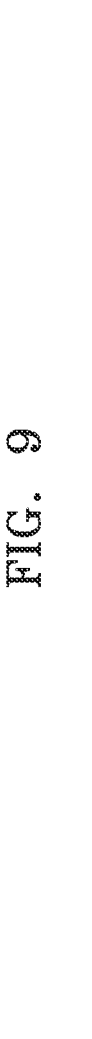

CORE–N

CORE–1

CORE–0

HALT IP —— 500

Receive halt request from Core–0 —— S500

Transmit core–halt request to Core–1 —— S502

Transmit core–halt request to Core–N —— S502

Permit Core–0 to lock with shared resource —— S504

Receive a release request from Core–0 —— S506

Transmit a resume instruction to Core–1 —— S508

Transmit a resume instruction to Core–N —— S508

Receive notification indicating a change in system parameter from Core–0 —— S510

Receive notification indicating a change in system parameter from Core–1 —— S510 notify the change in the system parameter to the core–N —— S512

SYSTEM AND METHOD FOR HALTING PROCESSING CORES IN A MULTICORE SYSTEM

CROSS REFERENCE TO RELATED APPLICATION

This application claims priority from Indian Patent Application No. 202141037464 filed on Aug. 18, 2021, in the Indian Intellectual Property Office, the entire contents of which are herein incorporated by reference in their entirety.

BACKGROUND

The present disclosure relates to a multicore computing device and a multicore computing method and, in particular, relates to a Multicore processor system to provide a halt mechanism for halting processing cores in the Multicore processor system.

In a Multicore system having multiple cores, threads or processes may be scheduled across the multiple cores to improve processing overhead and reduce power consumption. With parallel processing, shared common resources may be protected and accesses may be serialized. In certain cases, deterministic behavior is required to complete the shared resource access in a stipulated time. Related art synchronization methods such as Semaphore, Spinlock, or Global Interrupt lock provide a critical section protection. However, such critical section protection adds overhead of a nondeterministic wait, thereby generating transactions on bus, cache coherency, dependency of exclusive memory monitoring to support atomic access, and dependency of synchronization barriers. In some cases, a spinlock contention decreases activity on the core holding lock by about 9.5%.

SUMMARY

According to an aspect of one or more example embodiments, there is provided a multicore computing device comprising a memory; a processor coupled to the memory, the processor comprising a plurality of cores; and a multiple input multiple output (MIMO) block coupled to the plurality of cores, wherein the MIMO block is configured to receive a halt request from a first core of the plurality of cores; transmit a core-halt request to one or more other cores of the plurality of cores other than the first core, to halt execution of the one or more other cores; and permit the first core to lock with a shared resource.

According to another aspect of one or more example embodiments, there is provided a method performed in a multicore computing device that includes a memory and a processor coupled to the memory, the processor including a plurality of cores and a multiple input multiple output (MIMO) block coupled to the plurality of cores. The method includes receiving, by the MIMO block, a halt request from a first core of the plurality of cores; transmitting, by the MIMO block, a core-halt request to one or more other cores of the plurality of cores other than the first core, to halt execution of the one or more other cores; and permitting, by the MIMO block, the first core to lock with a shared resource.

BRIEF DESCRIPTION OF THE DRAWINGS

The above and other aspects will become more apparent by describing in detail example embodiments with reference to the attached drawings, in which:

FIG. 2 illustrates an example of an operation flow of initiating a Halt request, in accordance with an embodiment;

FIG. 9 illustrates an example of a flowchart with a second process flow example of a multicore computing method, in accordance with an embodiment;

DETAILED DESCRIPTION

Figure 1:
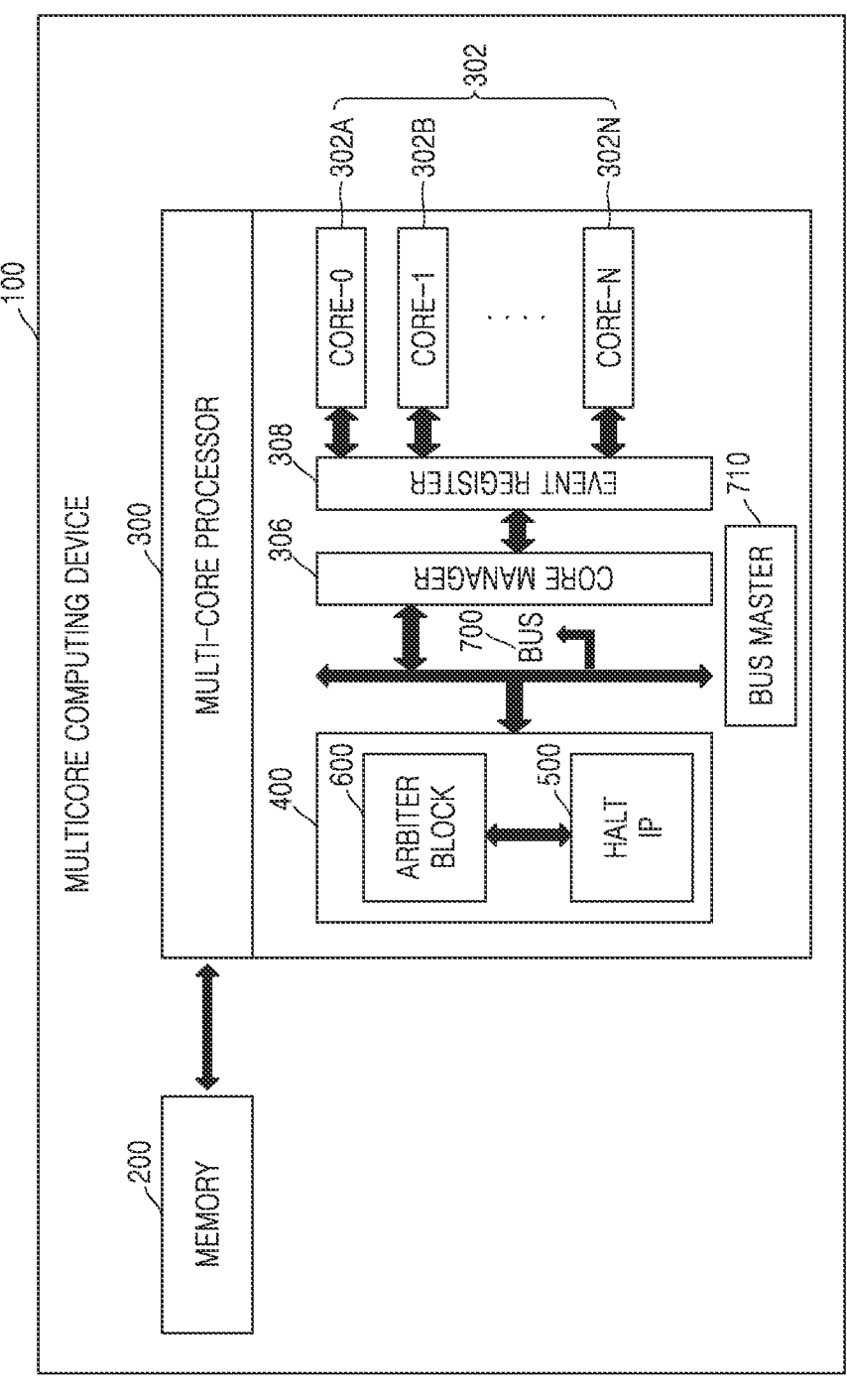
FIG. 1 illustrates a block diagram of an example of a multicore computing device, in accordance with an embodiment.

For the purpose of promoting an understanding of various example embodiments, reference will now be made to the various example embodiments illustrated in the drawings and specific language will be used to describe the same. The accompanying drawings are not to be considered as drawn to scale unless explicitly noted It will be understood by those skilled in the art that the foregoing general description and the following detailed description are explanatory of various example embodiments and are not intended to be restrictive thereof.

Reference throughout this specification to "an aspect", "another aspect" or similar language means that a particular feature, structure, or characteristic described in connection with the embodiment is included in at least one example embodiment. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which the various example embodiments belong. The system, methods, and examples provided herein are illustrative only and not intended to be limiting.

In this specification, the term "IP" may denote an "intellectual property", which will be understood by one of ordinary skill in the art as denoting an intellectual property block or core, where the IP block is a reusable unit of logic, cell or integrated circuit that is the intellectual property of one entity. For example, in some example embodiments, an intellectual property (IP) block may be considered a functional block.

As discussed above, in the related art, a spinlock contention on another core may slow activity on a core holding lock by approximately 9.5%.

For example, according to the related art, in a centralized synchronization mechanism for a multi-core processor, cores have to register for Sync activity. When all cores are registered, the cores, which loose in gaining semaphore, will be put to sleep. Further, it is not guaranteed to be in sleep always and left to the cores current activity. The core disables the fuse bit provided to support and ease the manufacturing process whereas if there are any non-recoverable errors observed in a production test, faulty cores may be permanently disabled and never participate in execution. A centralized hardware module provides the HW semaphore and other associated registers to support a Core disable/ enable option.

Accordingly, it is evident that, in the related art, emphasis is given to the faulty cores which may be permanently disabled and never participate in execution.

In view of each of the above-mentioned technical problems, there is a need of a multicore system and a multicore computing method to ensure that there is no permanent halt of the cores, and the cores may be resumed (i.e., resume operation) after a temporary timeout. Additionally, there is a need of a multicore system that may address the overhead of the nondeterministic wait, the generation of the transactions on the bus, the cache coherency, the dependency of the exclusive memory monitors to support the atomic access, and the dependency of the synchronization barriers.

FIG. 1 illustrates an example of a block diagram illustrating a multicore computing device in accordance with an embodiment. According to some example embodiments, a multicore computing device 100 may include a memory 200 and a Multi-core Processor 300. The Multi-core Processor 300 may be communicatively coupled to the memory 200.

In some example embodiments, the memory 200 may include one or more computer-readable storage media. In some example embodiments, the memory 200 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. The memory 200 may, in some example embodiments, be considered a non-transitory storage medium. The term "non-transitory" may indicate that the storage medium is not embodied in a carrier wave or a propagated signal. However, the term "non-transitory" should not be interpreted to mean that the memory 200 is non-movable. In some example embodiments, a non-transitory storage medium may store data that may, over time, change (e.g., in Random Access Memory (RAM) or cache).

The Multi-core Processor 300 may include a plurality of processing cores 302A, 302B, through 302N, a Core Manager 306, an Event Register 308, and a Multiple Input Multiple Output (MIMO) block 400. The plurality of processing cores 302A, 302B, through 302N may be collectively referred as processing cores 302, or cores 302, and may be individually referred as Core-0, Core-1, through Core-N where distinguishing among the processing cores 302 may assist in understanding. In some example embodiments, each of the processing cores 302 may include one or more pipelines of functional units (not shown). The functional units may include a cache instruction unit; an instruction translation unit or instruction decoder that may in turn include a microcode unit; a register renaming unit; reservation stations; data caches; execution units; a memory subsystem; and/or a retire unit including a reorder buffer. The Event Register 308 may be coupled to the processing cores 302 via the Core Manager 306. The event register is configurable by each of the processing cores 302 to perform a halt operation and a resume operation. The Core Manager 306 may be configured to increase a frequency of the Core-0, in response to reception of a permission to lock with a shared resource.

In some example embodiments, the multicore computing device 100 is a multi-core processor (e.g., a central processing unit (CPU) with multiple processing cores). The multi-core computing device 100 may be, for example, a laptop, a desktop computer, a mobile phone, a smart phone, Personal Digital Assistants (PDAs), a tablet, a phablet, or any other electronic device.

The MIMO block 400 may include a Multiple Input Multiple Output Hardware block (HALT IP) 500 and an Arbiter block 600. The MIMO block 400 may be communicatively coupled to the processing cores 302 using a bus 700. Further, although not shown in the FIG. 1, the bus 700 may comprise a bus master 710 by which the MIMO block 400 is interfaced as the BUS master 710 to a debug architecture.

FIG. 1 shows an example of the Multi-core Processor 300, according to an example embodiment. However, the Multi-core Processor 300 is not limited thereto and, in some example embodiments, the Multi-core Processor 300 may include less or more components than the number of components illustrated in FIG. 1. Further, the labels or names of the components are provided only for illustrative purposes and are not intended to limit the scope of the example embodiments. For example, in some example embodiments, two or more components of the Multi-core Processor 300 illustrated in FIG. 1 may be combined into a single component that may perform any or all of the operations of the two or more components.

FIG. 2 illustrates an example of an operation flow of initiating a Halt request, in accordance with an embodiment. Referring now to FIG. 2, an example of Initiating a Halt request based on configuration of a MIMO block is illustrated. According to some example embodiments, one processing core among the processing cores 302 may halt another core of the processing cores 302. For example, as illustrated in the top portion of FIG. 2, the Core-0 may halt (HLT) the Core-1 (illustrated by solid lines), or the Core-1 may halt (HLT) the Core-0 (illustrated by dotted line). In more detail, the HALT IP 500 of the MIMO block 400 may be configured to receive a halt request (HLT Req) such as a Halt Start from at least Core-0 of the processing cores 302. In some example embodiments, the halt request may be received by the HALT IP 500 in OpCode form. Further, the HALT IP 500 is configured to transmit a core-halt request (HLT) to one or more other cores of the processing cores 302 to halt processing operation of the one or more other cores of the processing cores 302. In other words, the HALT IP 500 transmits the core-halt request to the processing cores 302 other than the Core-0. As illustrated in the bottom portion of FIG. 2, the HALT-IP 500 may receive a halt request (HLT Req) from Core-0 and transmit a core-halt request (HLT) to Core-1, as illustrated by the solid lines. Alternatively, the HALT-IP 500 may receive a halt request (HLT Req) from Core-1 and transmit a core-halt request (HLT) to Core 0, as illustrated by the dotted lines. Further, the HALT IP 500 may be configured to permit the Core-0 to lock with a shared resource. Furthermore, the halt request received by the HALT IP 500 is not only limited to the OpCode form. In some example embodiments, the halt request may also be received in a signal form and on receiving the signal, the HALT IP 500 may refer to the Event Register 308 and may transmit the core-halt request to the one or more other cores of the processing cores 302.

According to some example embodiments, the HALT IP 500 may be configured to receive the halt request (HLT Req) from one or more cores of the processing cores 302. As an example, the HALT IP 500 may receive the halt request from each of the Core-0 and the Core-1. Further, the HALT IP 500 may receive the halt request from more than two cores of the processing cores 302. In other words, the HALT IP 500 may receive the halt request from any of the Core-0 through the Core-N.

According to some example embodiments, the BUS master 710 of the bus 700 may be configured to identify the halt requests received from the two or more cores of the processing cores 302 and handle the received halt requests based on a First Come First Serve (FCFS) technique, a Round Robin (RR) technique, and/or a queue-based technique.

According to some embodiments, the halt request (HLT Req) received by the HALT IP 500 from the Core-0 may include a timeout duration and a list of the processing cores 302 other than the Core-0.

Figure 3:
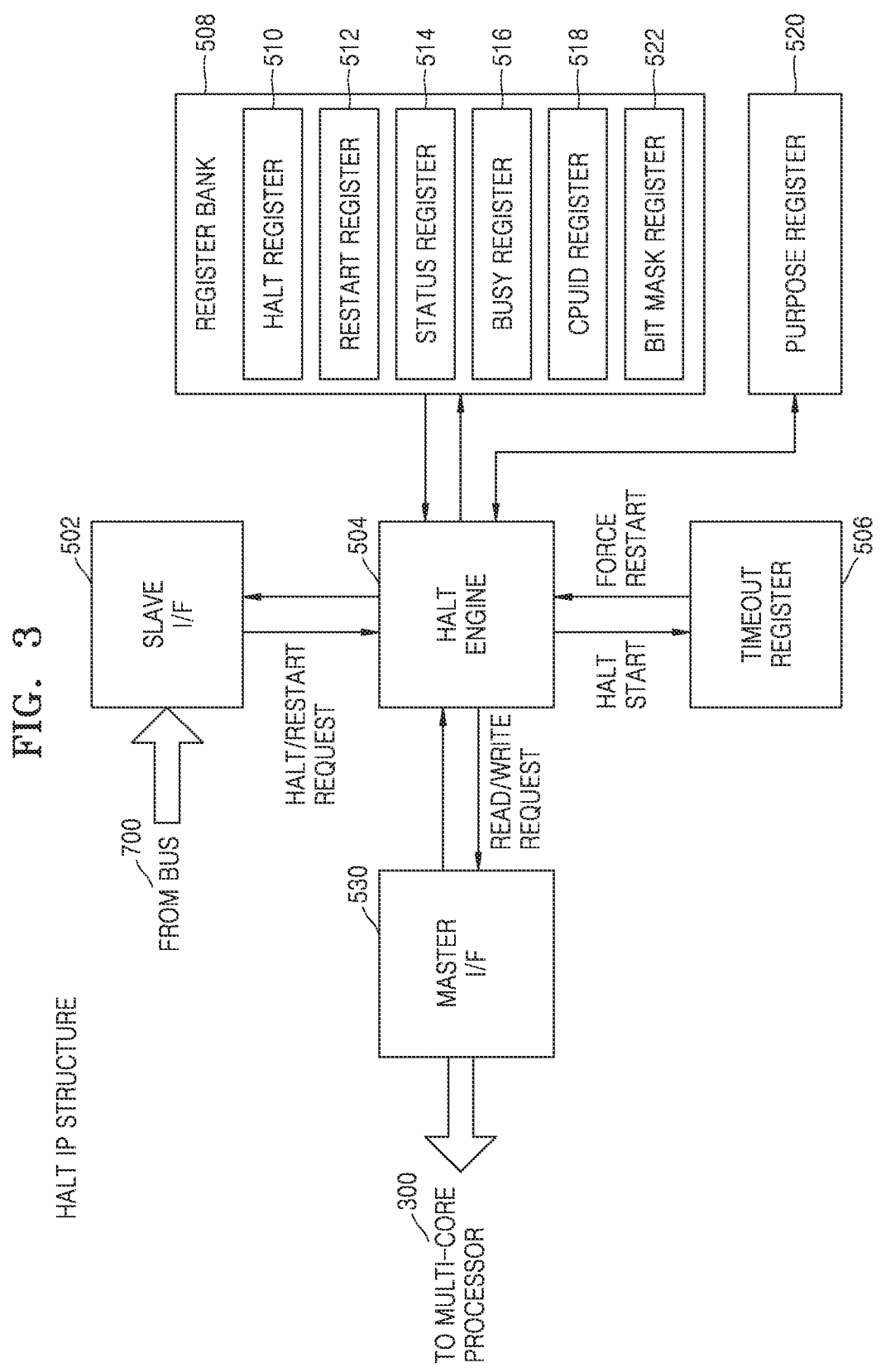
FIG. 3 illustrates an example of a structure of HALT IP, in accordance with an embodiment.

FIG. 3 illustrates an example of a structure of HALT IP, in accordance with the an embodiment. Referring now to FIG. 3, a block diagram of the structure of the HALT IP 500 within the MIMO block 400 will be described. The HALT IP 500 structure may include a Slave interface (I/F) 502, a Halt Engine 504, a Timeout Register 506, a Register Bank 508, a Purpose Register 520, and a Master interface (I/F) 530. Each of the Slave I/F 502, the Timeout Register 506, the Register Bank 508, the Purpose Register 520, and the Master I/F 530 are communicatively coupled to the Halt Engine 504 to exchange of information between the HALT IP 500 and the Processing Cores 302.

In detail, the Halt Engine 504 may be configured to generate transactions for initialization, and to manage core-halt start requests, core-restart requests, and acknowledgements of the core-halt request and the core-restart request. The transactions for initialization are required for a single time. The Master I/F 530 drives the generated transactions to the processing cores 302. In other words, a halt request fed to the bus 700 from the processing cores 302 is received by the halt engine 504 via the Slave I/F 502. Additionally, the halt engine 504 transmits the core-halt request to the processing cores 302 via the Master I/F 530. For example, the processing cores write instructions (e.g., Halt/restart requests, read/write requests, etc.) to the HALT IP 500 via the Slave I/F 502, and the HALT IP 500 writes the instructions to Debug Registers 904 (see, e.g., FIG. 5 to be described later) via the Master I/F 530.

According to some example embodiments, the Halt Engine 504 may be configured to set the timeout register 506 using the timeout duration specified in the received halt request and transmit a resume instruction (e.g., force restart) to each of the processing cores 302 other than Core-0 upon completion of the timeout duration. In other words, the Halt Engine 504 may transmit a resume instruction to the Core-1 through the Core-N upon completion of the timeout duration.

According to some example embodiments, the Purpose Register 520 may be configured to notify at least one change in a system parameter from at least one core of the processing cores 302 to other cores of the processing cores 302 via the Halt Engine 504.

Figure 4:
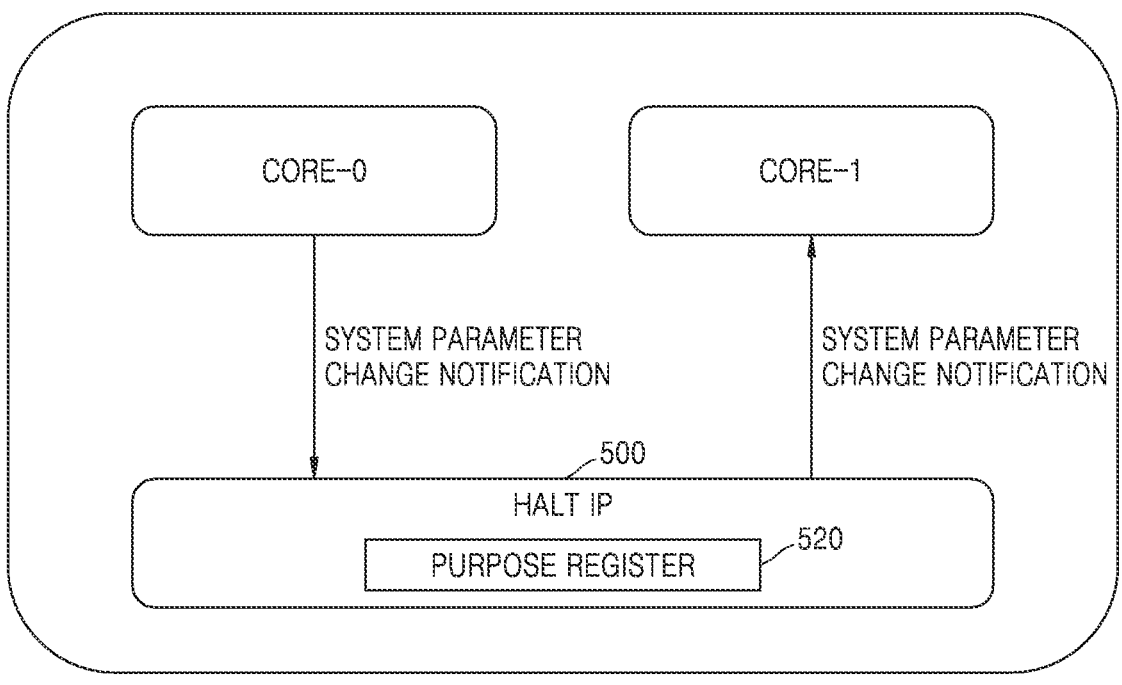
FIG. 4 illustrates an example of a process of notifying a change in system parameter within the Multicore processor system, in accordance with an embodiment.

FIG. 4 illustrates an example of a process of notifying a change in system parameter within the Multicore processor system, in accordance with an embodiment. As shown in FIG. 4, the Purpose Register 520 may receive a notification (e.g., system parameter change notification) regarding the change in the system parameter from the Core-0 and transmit the received notification to the Core-1 to notify the Core-1 of the change in the system parameter.

Returning to FIG. 3, according to some example embodiments, the register bank 508 may include a Halt register 510, a Restart register 512, a Status register 514, a Busy register 516, a CPU identification (CPUID) register 518, and a Bit Mask register 522. The Halt Engine 504 may be configured to control the exchange of information between the Multicore Processor 300 and the Register Bank 508.

According to some example embodiments, the Halt register 510 and the Restart Register 512 may be registers which are provided for the processing cores 302 and are updated based on reception of read/write instructions from a source core among the processing cores 302. For example, one of a dedicated bit or a bit mask of a single register may be used by the HALT IP 500, where each bit in the single register corresponds to a specific core among the processing cores 302.

According to some example embodiments, the Status Register 514 may be updated by the Halt Engine 504 after completion of the core halt start and the core restart operation.

According to some example embodiments, the Busy register 516 and the CPUID register 518 may be updated by the Halt Engine 504 once the core halt operation is started, and cleared when the core restart operation is finished.

According to some example embodiments, the Halt Engine 504 may update the Bit Mask Register 522 with an indication that that indicates which destination cores are to be halted based on a current state of the processing cores 302. Further, the Halt Engine 504 may have a direct signal connection to the Arbiter block 600. Thus, in case there is a conflict of requests from the processing cores 302, the Halt Engine 504 may arbitrate the conflict of requests by controlling the Arbiter block 600 of the Multi-core Processor 300. Arbitration management techniques such as the FCFS technique, the RR technique, and the queue-based technique may be used to manage the arbitration of the conflict of requests. However, example embodiments are not limited to the FCFS technique, the RR technique, and the queue-based technique. Any other arbitration techniques may also be used.

According to some example embodiments, the Arbiter block 600 may be configured to implement the FCFS technique to select a core from the processing cores 302 for servicing the halt request. In other words, the Arbiter block 600 may select the Core-0 from the Core-0 through the Core-N for servicing the halt request.

According to some example embodiments, the Arbiter block 600 may be configured to implement one of the RR technique and the queue-based technique for servicing the halt requests from two or more cores of the processing cores 302. In other words, the Arbiter block 600 may select the Core-0 and the Core-1 from the Core-0 through the Core-N for servicing the halt request.

Figure 5:
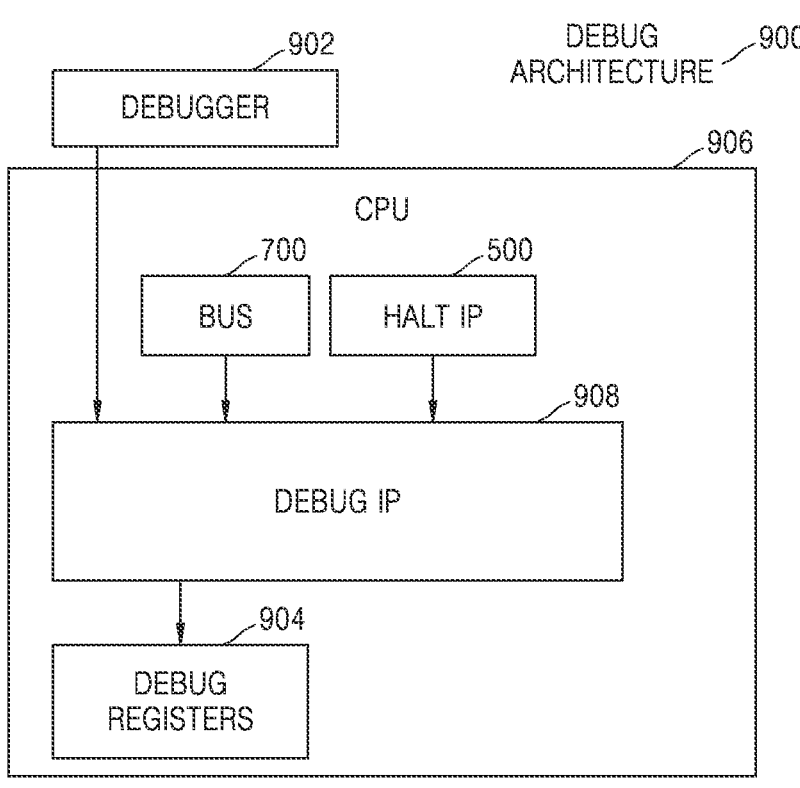
FIG. 5 illustrates a block diagram of an example of a debug Architecture, in accordance with an embodiment.

FIG. 5 illustrates a block diagram of an example of a debug Architecture, in accordance with an embodiment. In FIG. 5, a debug Architecture 900 with the HALT IP 500 as Master to a Debug IP 908 is shown. The Debug Architecture 900 includes a Debugger 902, Debug Registers 904, a Central Processing Unit (CPU) 906, and the Debug IP 908. As shown in FIG. 5, the HALT IP 500 is interfaced with the Debug IP 908 within the CPU 906, and is accessed as a Memory Mapped IO. In some example embodiments, the CPU 906 may correspond to the Multi-core Processor 300. Also, when the HALT IP 500 is added as separate block within the CPU 906, a custom instruction for triggering a halt operation and a resume operation of the processing cores may be added to an instruction set architecture (ISA). The custom instruction may be of the form, for example:

halt Op1, Op2 rsm Op1, where the Op1 Bitmap indicates halt and resume request for the processing cores, in case a value of the Op1 Bitmap is 1, it corresponds to the halt request of Core-0 (Each bit represents a specific core), In case a value of the Op1 Bitmap is 0, it corresponds to the resume instruction (0: core-resume instruction), and the Op2 Bitmap indicates a timeout value.

The Debug Registers 904 may be accessed through the Debug IP 908. By adding the HALT IP 500 as one of the masters to the CPU 906, the HALT IP 500 may be accessible by the processing cores 302 of the CPU 906 (i.e. the Multi-core Processor 300). Further, the CPU 906 is connected to a Dump PC (although, not shown in FIG. 5) which monitors a working state of the CPU 906 at a specific time. When any core has a fatal error or otherwise terminates abnormally, key pieces of a program state in such a situation are dumped at the specific time to the Dump PC. Furthermore, with reference to the components of FIGS. 1 and 3, components denoted by the same reference numerals in the FIG. 5 refer to the same components and accordingly their detailed explanation is omitted for conciseness.

Figure 6A:
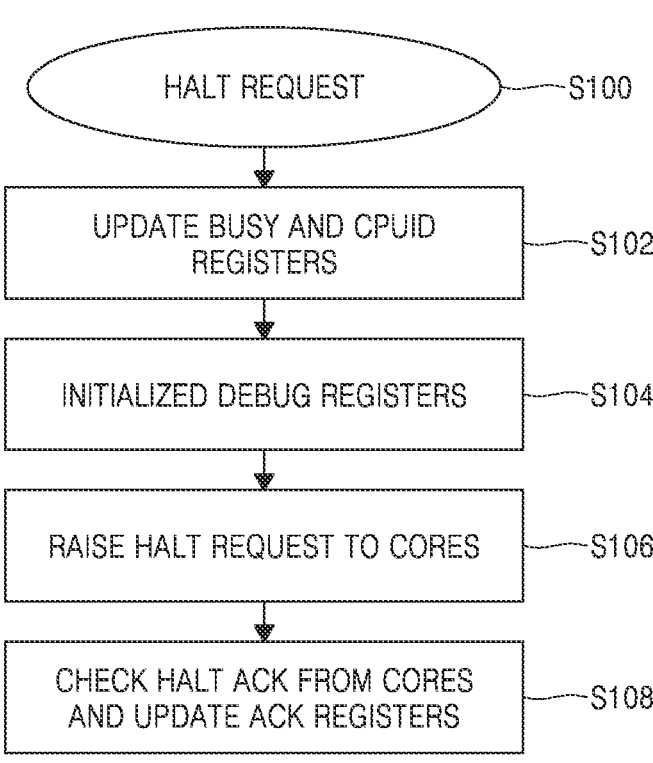
FIGS. 6A and 6B illustrate an example of a flowchart of operations performed by a halt engine of the HALT IP within a multiple-in-multiple-out (MIMO) configuration, in accordance with various embodiments.
Figure 6B:
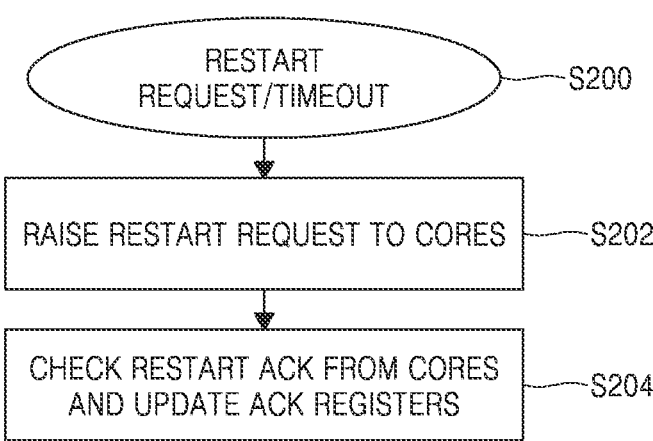

FIGS. 6A and 6B illustrate an example of a flowchart of operations performed by a halt engine of the HALT IP within a multiple-in-multiple-out (MIMO) configuration, in accordance with various embodiments. Referring now to FIGS. 6A and 6B, a flowchart explanation of operations performed by the halt engine 504 of the HALT IP 500 within the MIMO block 400 will be described. FIG. 6A shows operations of the HALT IP after receiving a halt request. FIG. 6B shows operations of the HALT IP to restart.

At block S100, halt engine 504 receives the halt request (HLT Req) from the Core-0 of the processing cores 302. Flow proceeds to block S102.

Referring to FIG. 6A, at block S102, the Halt Engine 504 updates the Busy Register 516 and the CPUID register 518 after a start of the core halt operation. Flow proceeds to block S104.

At block S104, after the start of the core halt operation, the halt engine 504 initializes the Debug Registers 904 after receiving a request from the Core-0 (302A) of the Multi-core Processor 300 via the bus 700. Flow proceeds to block S106.

At block S106, subsequent to initialization of the Debug Registers 904, the Halt Engine 504 raises the received halt request to the cores among the processing cores 302 other than the Core-0, via the Master I/F 530. In other words, the Halt Engine 504 transmits the core-halt request to the Core-1 to the Core-N of the processing cores to halt the execution of the Core-1 to the Core-N. Flow proceeds to block S108.

At block S108, the halt engine 504 receives halt acknowledgement information from the Core-1 to the Core-N and updates acknowledgement registers (not shown in FIG. 3) based on the received halt acknowledgement information.

Referring to FIG. 6B, at block S200, the Halt Engine 504 sets the Timeout Register 506 based on the timeout duration specified in the halt request received from the Core-0. Flow proceeds to block S202.

At block S202, the Halt Engine 504 raises the core-restart request to each of the processing cores 302 other than the Core-0 upon completion of the timeout duration set in the Timeout Register 506. In other words, the Halt Engine 504 transmits a resume instruction to each of the processing cores 302 other than the Core-0 upon completion of the timeout duration. Flow proceeds to block S204.

At block S204, the Halt Engine 504 checks for acknowledgement of the core-restart request from each of the processing cores 302 other than the Core-0, and updates the acknowledgement registers based on confirmation of the acknowledgement of the core-restart request from each of the processing cores 302 other than the Core-0.

Figure 7:
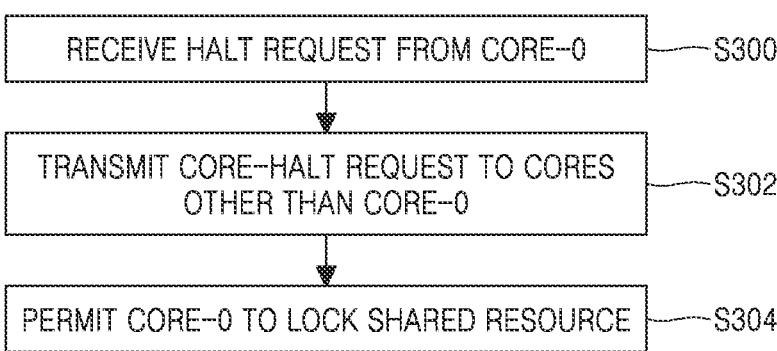
FIG. 7 illustrates an example of a flowchart of a multicore computing method, in accordance with various embodiments.

FIG. 7 illustrates an example of a flowchart of a multicore computing method, in accordance with various embodiments. Referring now to FIG. 7, at block S300, the HALT IP 500 of the MIMO block 400 receives the halt request from at least the Core-0 of the processing cores 302. Flow proceeds to block S302.

At block S302, the HALT IP 500 transmits the core-halt request to the processing cores 302 other than the Core-0. Flow proceeds to block S304.

At block S304, the HALT IP 500 permits the Core-0 to lock with the shared resource. In other words, the Core Manager 306 of the Multi-core Processor 300 receives permission from the MIMO block 400 to lock the Core-0 with the shared resource. Further the core Manager 306 increases a frequency of the Core-0 in response to the reception of the permission from the MIMO block 400 to lock the Core-0 with the shared resource.

Figure 8:
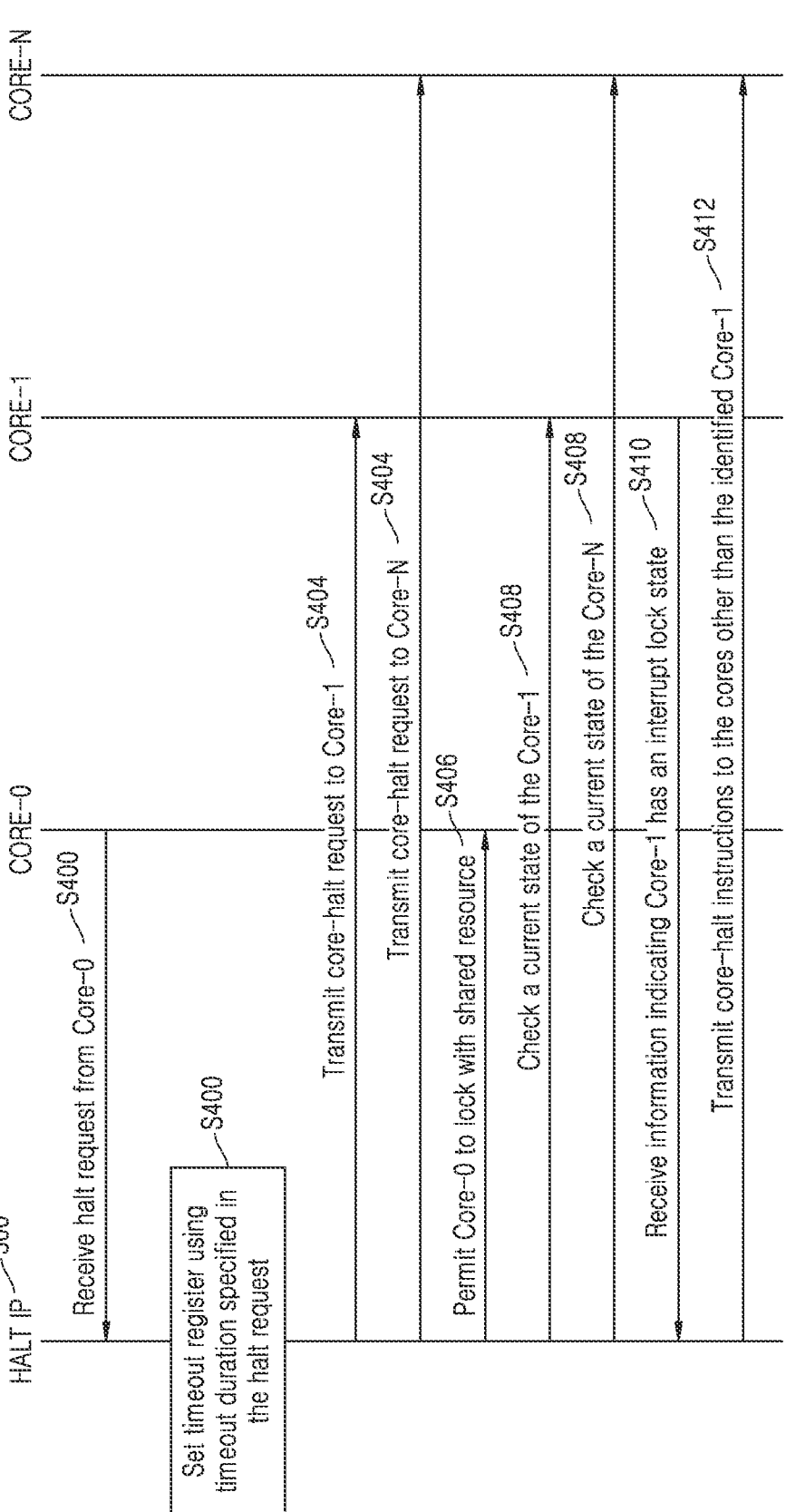
FIG. 8 illustrates an example of a flowchart showing a first process flow example of a multicore computing method, in accordance with an embodiment.

FIG. 8 illustrates an example of a flowchart showing a first process flow example of a multicore computing method, in accordance with an embodiment. Referring now to FIG. 8, processing at blocks S400 and S406 are similar to the operations S300 and S304, respectively, illustrated in FIG. 7 and therefore repeated description thereof is omitted for conciseness. At block S402, the HALT IP 500 sets the timeout register using the timeout duration specified in the received halt request, as discussed above. At block S404, the HALT IP 500 transmits the core-halt request to two or more cores of the processing cores 302 other than the Core-0. In other words, the HALT IP 500 transmits the core-halt request to the two or more cores among the Core-1 through Core-N.

At block S408, the HALT IP 500 checks a current state of the two or more cores of the processing cores 302 other than the Core-0. In other words, the HALT IP 500 checks the current state of the two or more core among the Core-1 through Core-N. Flow proceeds to block S410.

At block S410, the HALT IP 500 receives information regarding an interrupt lock state from Core-1 of the processing cores 302 and identifies that the Core-1 has the interrupt lock state based on the received information. According to some example embodiments, the interrupt lock state of the Core-1 may be further identified through Global Interrupt Control (GIC) before initiating the halt request. Flow proceeds to block S412.

At block S412, the HALT IP 500 transmits core-halt instructions to the processing cores 302 other than the identified Core-1. Although, execution of operations at blocks S408, S410 and S412 are described in context with processing of halting the processing cores 302 with reference to the FIG. 7, the operations at the blocks S408, S410 and S412 may be executed separately from the processing of halting the processing cores 302 in FIG. 7.

FIG. 9 illustrates an example of a flowchart with a second process flow example of a multicore computing method, in accordance with an embodiment. Referring now to FIG. 9, the operations at blocks S500, S502, S504 are similar to the operations at blocks S300, S302, and S304 in FIG. 7, and accordingly, repeated description thereof is omitted for conciseness. At block S506, the HALT IP 500 receives a release request from the Core-0. The release request received from the Core-0 is indicative of the release of the shared resource by the Core-0. Flow proceeds to block S508.

At block S508, the HALT IP 500 transmits the resume instruction to each of the processing cores 302 other than the Core-0 in response to the received release request from the Core-0. Flow proceeds now to block S510.

At block S510, the HALT IP 500 receives notification indicating the change in the system parameter from each of the Core-0 and Core-1 of the processing Cores 302. Also, the HALT IP 500 may receive the halt request from more than two cores of the processing cores 302. In other words, the HALT IP 500 receives the halt request from one or more of the Core-0 through the Core-N. At block S512, subsequent to the reception of the halt request from more than two cores of the processing cores 302, the HALT IP 500 notifies the change in the system parameter to the processing cores 302 other than the Core-0 and the Core-1 based on the received notification from each of the Core-0 and the Core-1.

Figure 10:
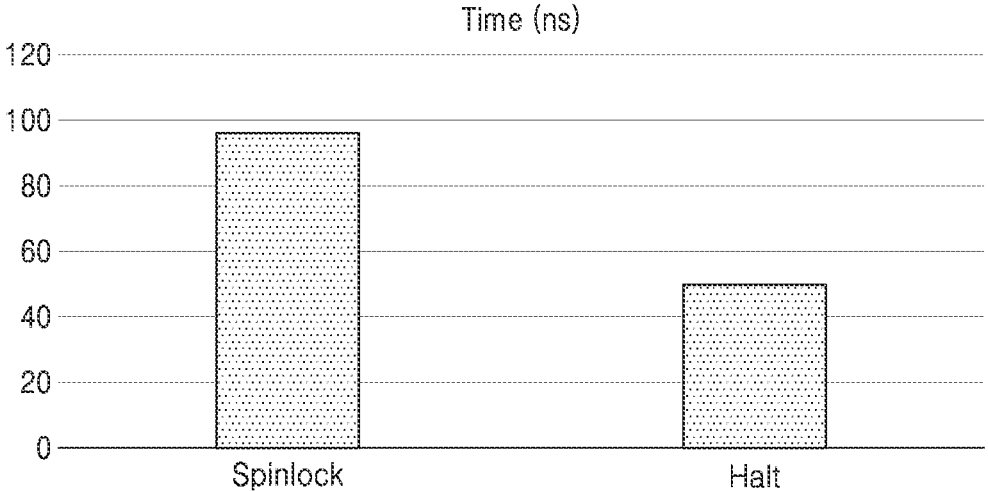
FIG. 10 illustrates an example of a comparison graph of simulation time between a related art spinlock acquisition mechanism and the multicore computing method in accordance with an embodiment.

FIG. 10 illustrates an example of a comparison graph of simulation time between a related art spinlock acquisition mechanism and the multicore computing method in accordance with an embodiment. In accordance with various example embodiments, the multicore computing method has advantages over the legacy spinlock synchronization method.

In detail, in the related art spinlock synchronization method, the cache line width always needs to be aligned, and the cache maintenance operation is necessary to maintain the cache coherency. However, in the multicore computing method according to various example embodiments, there is no need of cache line dependency and the cache Maintenance operation in comparison to the related art spinlock synchronization method. Further, the multicore computing method according to various example embodiments may also overcome the requirement of Synchronization barriers such as Data Memory Barrier (DMB), Data Synchronization Barrier (DSB), or Instruction Synchronization Barrier (ISB) in the related art spinlock synchronization method. Furthermore, the multicore computing method according to various example embodiments also may overcome the requirement of exclusive Monitors in the related art spinlock synchronization method. Furthermore, the multicore computing method according to various example embodiments may also overcome the requirement of additional transactions generated during the Deadlock in the related art spinlock synchronization method. Furthermore, as is evident from FIG. 10, the simulation time of the multicore computing method according to various example embodiments is smaller in comparison to the simulation time of the related art spinlock synchronization method.

Figure 11:
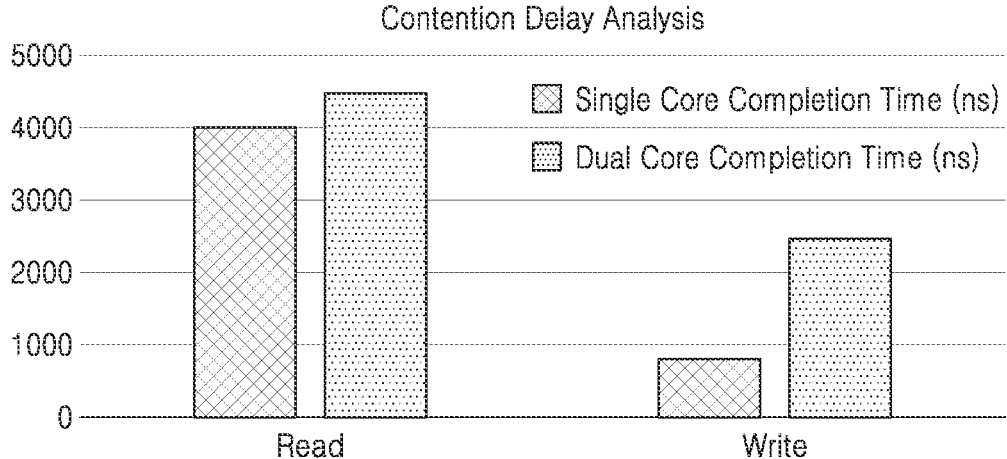
FIG. 11 illustrates an example of a contention delay analysis in a dual core environment with regard to the multicore computing method, in accordance with an embodiment.

FIG. 11 illustrates an example of a contention delay analysis in a dual core environment with regard to the multicore computing method, in accordance with an embodiment. When multiple cores are generating transactions simultaneously, the access latency and completion time of transactions initiated by core increase. As shown in FIG. 11, the experimental results of 4 KB Dynamic random-access memory (DRAM) buffer access by Dual core and Single core are illustrated. When both of the cores perform Read/Write of the DRAM, the overall completion time of the read/write increases significantly. Thus, the proposed multicore computing method help in the critical routines/services where the deterministic behavior is required.

Apart from the above-described advantages, using the multicore computing method according to various example embodiments allows to identify key critical section areas where deterministic behavior is required and the multicore computing method may initiate Halt of other cores through the dedicated Halt IP 500 or through the enhanced debug architecture. The HALT IP 500 may provide the Core with the Bit Mask register 522 and the Timeout register 506. The Timeout register 506 may be provided to ensure that there is no permanent Halt of the processing cores 302 and the processing cores 302 may be resumed post timeout.

Furthermore, advantageously, the multicore computing method according to various example embodiments addresses the deterministic requirement and overhead of the legacy synchronization mechanism by stopping or halting the other processing cores 302, with little software architecture or software migration overhead. The Halt IP 500 includes process instructions to initiate Halt, and enhances the debug architecture to initiate Halt invoked as the memory mapped IO. Further, as shown in FIG. 10, the emulation results are achieved by the multicore computing method according to various example embodiments in about 50 ns against the ideal spin lock acquisition time of about 96 ns (minimum, while maximum is nondeterministic). Thus, the multicore computing method according to various example embodiments takes less time to achieve the emulation results, and requires low software migration efforts in comparison to the related art spinlock synchronization method.

Some example embodiments disclosed herein may be implemented using processing circuitry. For example, some example embodiments disclosed herein may be implemented using at least one software program running on at least one hardware device and performing network management functions to control the elements.

The foregoing description of some example embodiments will so fully reveal the general nature thereof that others may, by applying current knowledge, readily modify and/or adapt for various applications some example embodiments without departing from the spirit and scope of the appended claims, and, therefore, such adaptations and modifications should and are intended to be comprehended within the meaning and range of equivalents of the appended claims. It is to be understood that the phraseology or terminology employed herein is for the purpose of description and not of limitation. Therefore, while some example embodiments herein have been described in terms of examples, those skilled in the art will recognize that some example embodiments may be practiced with modification within the spirit and scope of the appended claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those operations that are not dependent on other operations may be performed in parallel with the other operations. The scope of embodiments is by no means limited by these specific examples. Numerous variations, whether explicitly given in the specification or not, such as differences in structure, dimension, and use of material, are possible. The scope of embodiments is at least as broad as given by the following claims.

Various example embodiments having thus been described, it will be obvious that the same may be varied in many ways. Such variations are not to be regarded as a departure from the intended spirit and scope of the various example embodiments described herein, and all such modifications as would be obvious to one skilled in the art are intended to be included within the scope of the following claims.

We claim:

1. A multicore computing device comprising:
a memory; and
a processor coupled to the memory, the processor comprising:
    a plurality of cores; and
    a multiple input multiple output (MIMO) block coupled to the plurality of cores,
wherein the MIMO block comprises a timeout register and a HALT IP, the HALT IP being configured to:
    receive a halt request from a first core of the plurality of cores;
    transmit a core-halt request to one or more other cores of the plurality of cores other than the first core, to halt execution of the one or more other cores; and
    permit the first core to continue execution and to lock with a shared resource,
wherein the halt request comprises a timeout duration and a list of the one or more other cores, and
wherein the MIMO block is configured to set the timeout register based on the timeout duration specified in the halt request.

2. The multicore computing device as claimed in claim 1, wherein the MIMO block is configured to transmit a resume instruction to each of the one or more other cores upon completion of a timeout for the timeout duration.

3. The multicore computing device as claimed in claim 1, wherein the MIMO block is configured to:
    receive a release request from the first core, the release request indicating a release of the shared resource by the first core; and
    transmit a resume instruction to each of the one or more other cores, based on the release request.

4. The multicore computing device as claimed in claim 1, wherein the MIMO block comprises an arbiter block.

5. The multicore computing device as claimed in claim 4, wherein the MIMO block is configured to receive the halt request from the first core and receive a halt request from a second core of the plurality of cores.

6. The multicore computing device as claimed in claim 5, wherein the arbiter block is configured to implement a first come first serve (FCFS) technique to select a service core from among the first core and the second core, and the service core that is selected services the halt request of the service core that is selected.

7. The multicore computing device as claimed in claim 5, wherein the arbiter block is configured to implement a round robin technique or a queue-based technique for servicing the halt requests from the first core and the second core.

8. The multicore computing device as claimed in claim 1, wherein the MIMO block is configured to:
    check a current state of each of the one or more other cores;
    identify a second core having an interrupt lock state, based on the current states; and
    transmit a halt instruction to other cores except the second core that is identified.

9. The multicore computing device as claimed in claim 1, wherein the MIMO block is coupled to the plurality of cores using a bus, and
    the bus comprises a BUS master.

10. The multicore computing device as claimed in claim 9, wherein at least two cores from the plurality of cores transmit a halt request to the MIMO block, and
    wherein the BUS master is configured to:
    identify that the halt requests are received from the at least two cores;
    handle the halt requests based on one of: a First Come First Serve (FCFS) technique, a Round Robin (RR) technique, or a queue-based technique.

11. The multicore computing device as claimed in claim 1, further comprising a core manager configured to increase a frequency of the first core, based on the permission to lock with the shared resource.

12. The multicore computing device as claimed in claim 1, wherein the MIMO block comprises a purpose register configured to notify at least one system parameter change from at least one core of the plurality of cores to other cores of the plurality of cores other than the at least one core.

13. The multicore computing device as claimed in claim 1, wherein the MIMO block is coupled to the plurality of cores using a bus, and
    the MIMO block is interfaced as a BUS master to a debug architecture.

14. The multicore computing device as claimed in claim 1, wherein the processor further comprises an event register coupled to the plurality of cores, and
    the event register is configurable by each of the plurality of cores to perform a halt operation and a resume operation for other cores of the plurality of cores.

15. A method comprising:
in a multicore computing device that includes a memory and a processor coupled to the memory, the processor including a plurality of cores and a multiple input multiple output (MIMO) block that is coupled to the plurality of cores and that comprises a timeout register:
    receiving, by a HALT IP of the MIMO block, a halt request from a first core of the plurality of cores;
    transmitting, by the HALT IP of the MIMO block, a core-halt request to one or more other cores of the plurality of cores other than the first core, to halt execution of the one or more other cores; and permitting, by the HALT IP of the MIMO block, the first core continue execution and to lock with a shared resource, wherein the halt request comprises a timeout duration and a list of the one or more other cores and wherein the MIMO block is configured to set the timeout register based on the timeout duration specified in the halt request.

16. The method as claimed in claim 15, further comprising: transmitting, by the MIMO block, a resume instruction to each of the one or more other cores upon completion of a timeout for the timeout duration.

\* \* \* \* \*